(12) United States Patent
Mori

(10) Patent No.: US 10,979,620 B2
(45) Date of Patent: Apr. 13, 2021

(54) IMAGE PROCESSING APPARATUS FOR PROVIDING INFORMATION FOR FOCUS ADJUSTMENT, CONTROL METHOD OF THE SAME, AND STORAGE MEDIUM

(71) Applicant: CANON KABUSHIKI KAISHA, Tokyo (JP)

(72) Inventor: Shingo Mori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/680,810

(22) Filed: Nov. 12, 2019

(65) Prior Publication Data
US 2020/0154056 A1 May 14, 2020

(30) Foreign Application Priority Data
Nov. 14, 2018 (JP) .............................. JP2018-214137

(51) Int. Cl.
*H04N 5/232* (2006.01)
*H04N 5/262* (2006.01)

(52) U.S. Cl.
CPC ... *H04N 5/232121* (2018.08); *H04N 5/23293* (2013.01); *H04N 5/232127* (2018.08); *H04N 5/2621* (2013.01); *H04N 5/2628* (2013.01)

(58) Field of Classification Search
CPC ....... H04N 5/232121; H04N 5/232127; H04N 5/232939
See application file for complete search history.

(56) References Cited

U.S. PATENT DOCUMENTS 9,591,246 B2  3/2017  Oikawa
2014/0176776 A1  6/2014  Morita
(Continued)

FOREIGN PATENT DOCUMENTS

JP  2003-090952 A  3/2003
JP  2006-054536 A  2/2006
(Continued)

OTHER PUBLICATIONS

Kenji Onuki, U.S. Appl. No. 16/683,408, filed Nov. 14, 2019 Image Processing Apparatus for Providing Information for Confirming Depth Range of Image, Control Method of the Same, and Storage Medium.

(Continued)

*Primary Examiner* — Christopher K Peterson
(74) *Attorney, Agent, or Firm* — Cowan, Liebowitz & Latman, P.C.

(57) ABSTRACT

An image processing apparatus comprises at least one processor which function as: an obtaining unit configured to obtain an image; a scaling unit configured to generate a scaled image obtained by scaling at least a portion of the obtained image; and a display control unit configured to display the obtained image or the scaled image and defocus information including a shift amount and a shift direction of a focal point in a superimposed manner on a display, wherein in a case where displaying the obtained image, the display control unit superimposes defocus information of a first defocus range that includes a range to be focused, and in a case where displaying the scaled image, the display control unit superimposes defocus information of a second defocus range that includes at least a portion of a defocus range of the scaled image.

19 Claims, 11 Drawing Sheets

(56) References Cited

U.S. PATENT DOCUMENTS

| | | |
|---|---|---|
| 2014/0253760 A1 | 9/2014 | Watanabe et al. |
| 2014/0267869 A1 | 9/2014 | Sawa |
| 2015/0054982 A1 | 2/2015 | Ota |
| 2016/0127636 A1* | 5/2016 | Ito .................... H04N 5/232122 348/333.12 |
| 2017/0064192 A1* | 3/2017 | Mori ................ H04N 5/232945 |
| 2017/0201674 A1 | 7/2017 | Yamamoto et al. |
| 2017/0372673 A1* | 12/2017 | Yeung ................... G09G 5/005 |
| 2018/0007290 A1 | 1/2018 | Matsunaga |
| 2019/0304122 A1 | 10/2019 | Matsunaga et al. |

FOREIGN PATENT DOCUMENTS

| | | |
|---|---|---|
| JP | 2014-197824 A | 10/2014 |
| JP | 2016-009062 A | 1/2016 |

OTHER PUBLICATIONS

The above patent documents were cited in a Jan. 19, 2021 Notice of Allowance, which is not enclosed, that issued in U.S. Appl. No. 16/683,408.

* cited by examiner

FIG. 2A
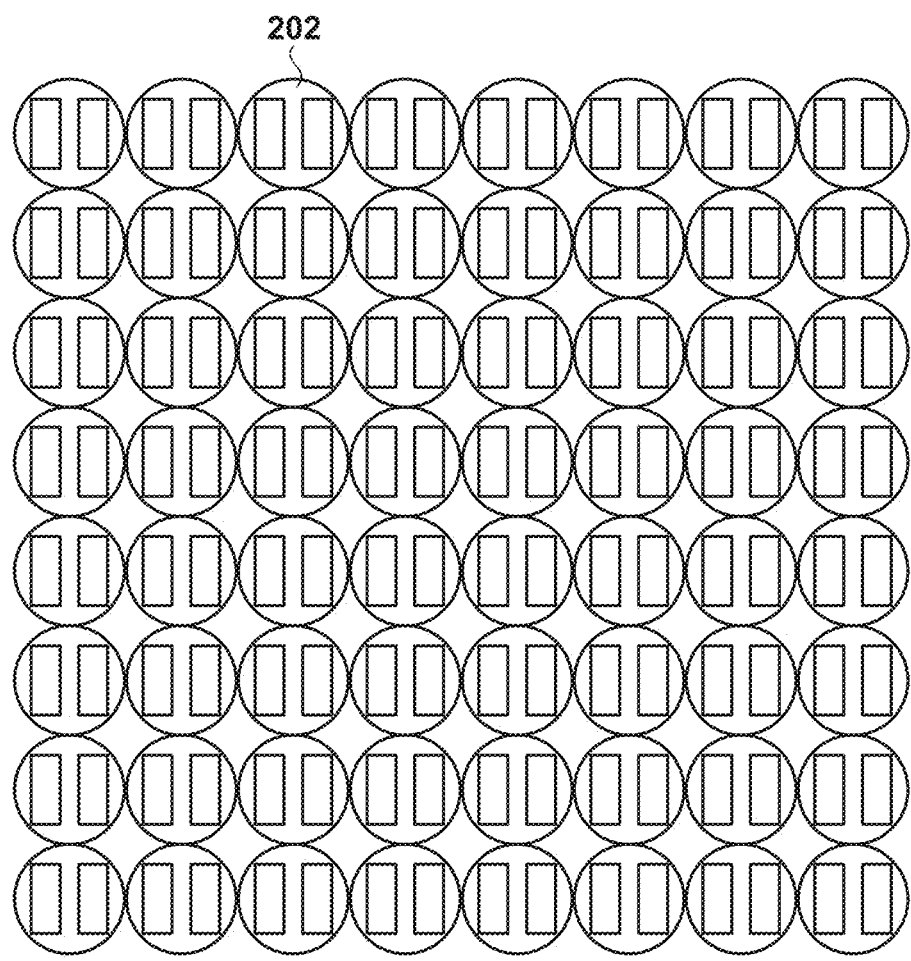
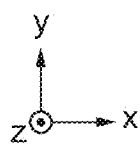
FIG. 2B
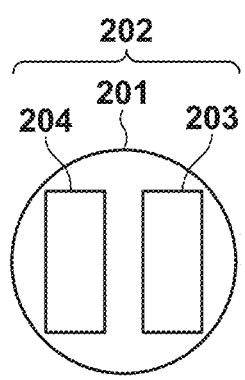

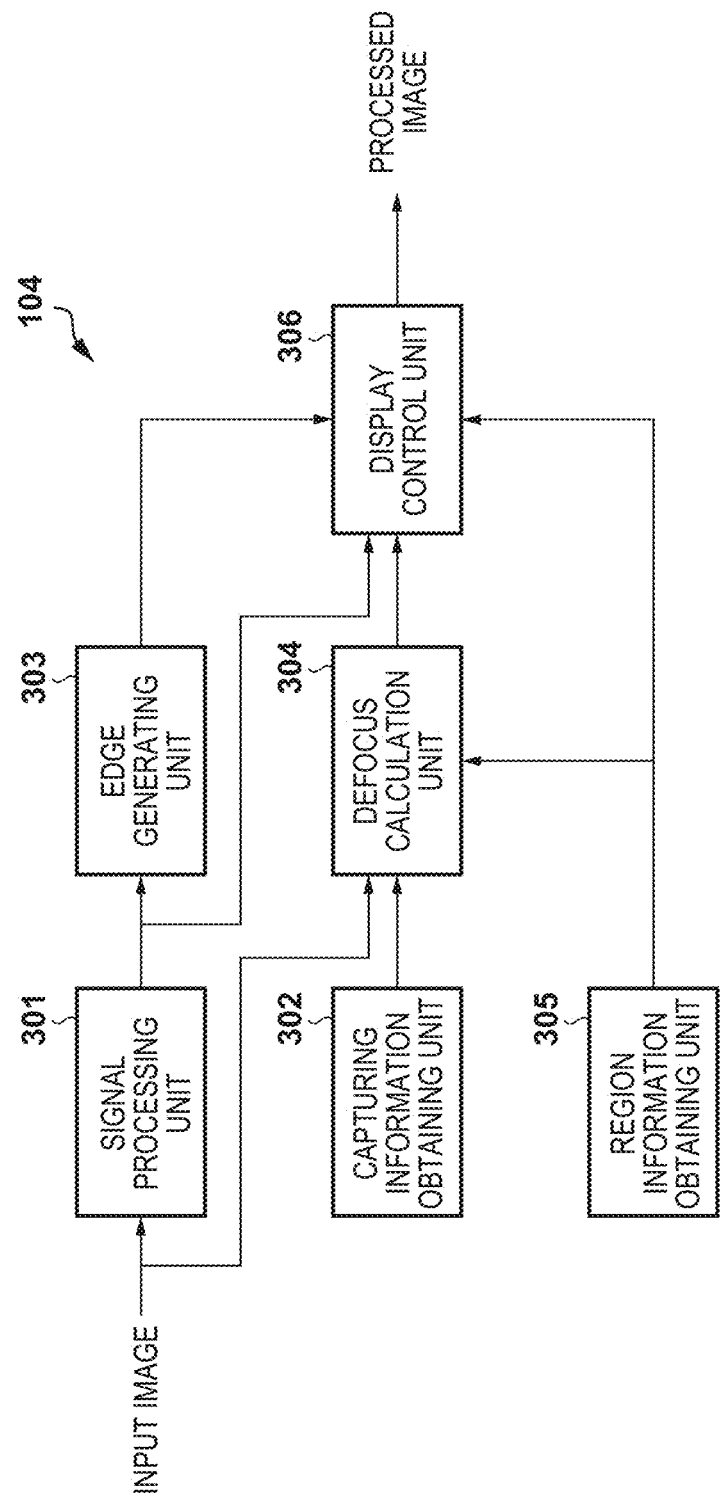

F I G. 7
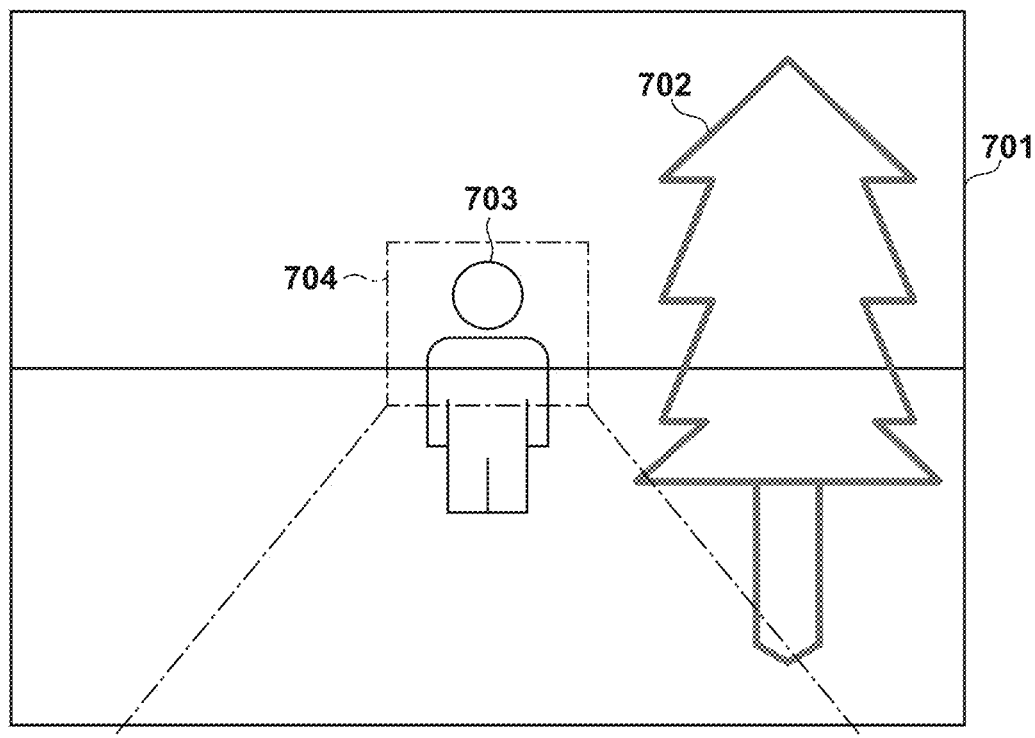
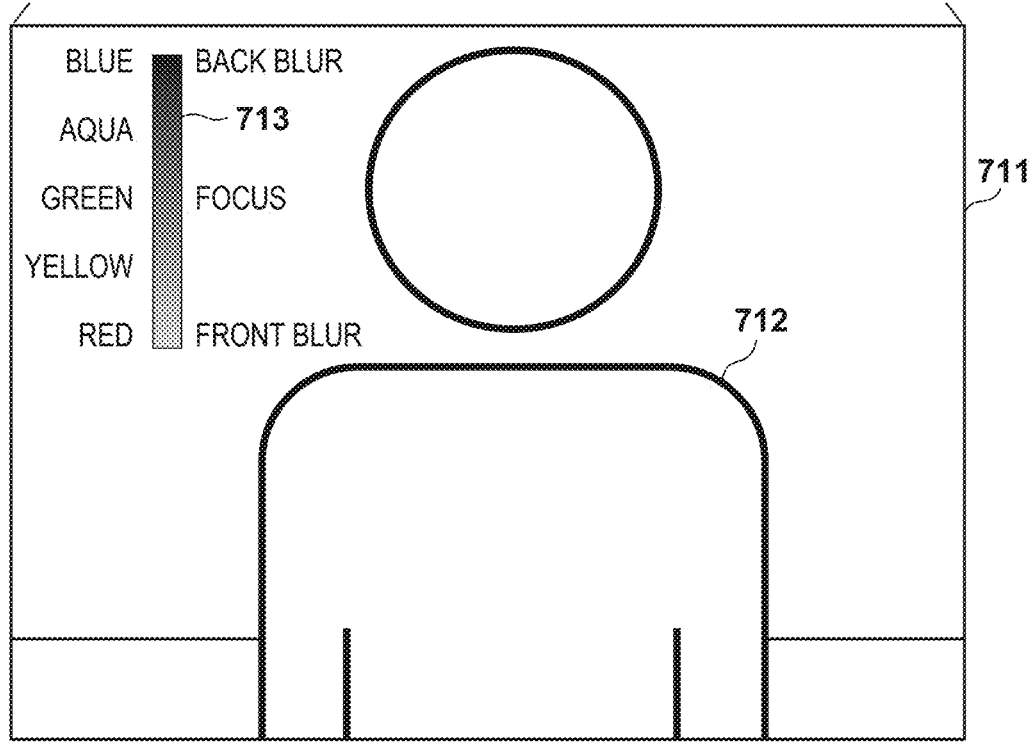

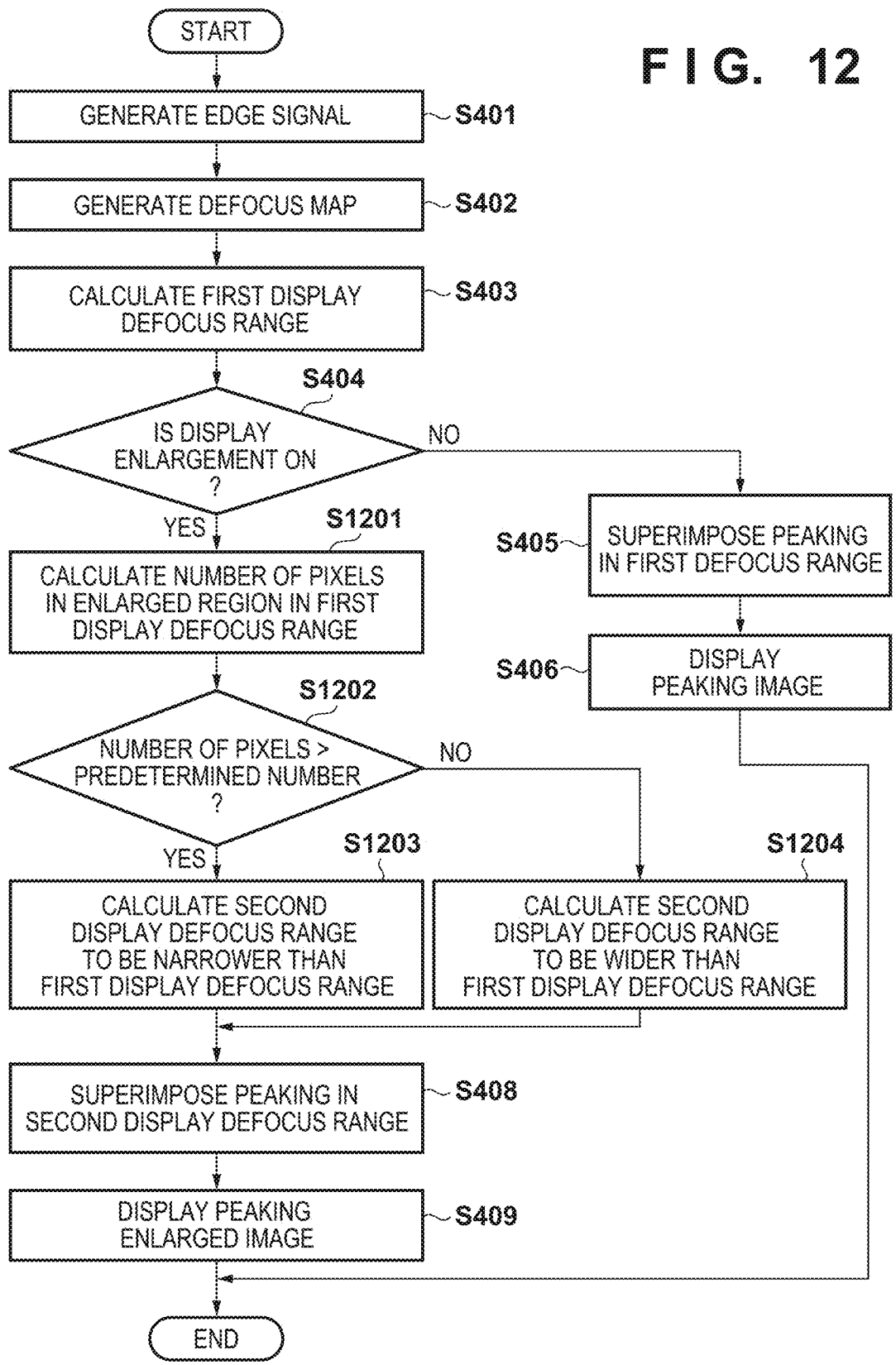

IMAGE PROCESSING APPARATUS FOR PROVIDING INFORMATION FOR FOCUS ADJUSTMENT, CONTROL METHOD OF THE SAME, AND STORAGE MEDIUM

BACKGROUND OF THE INVENTION

Field of the Invention

The present invention relates to an image processing apparatus that provides information for focus adjustment, a control method of the same, and a storage medium.

Description of the Related Art

In the related art, in a photographing device such as a digital camera, a technique is known in which the current focus state of a subject is displayed in an electronic viewfinder (EVF) using a display element such as a liquid crystal display (LCD) such that the user can capture an image while confirming the depth of field and the focus state of the subject, and the like.

Japanese Patent Laid-Open No. 2006-54536 discloses a technique for controlling the aperture of a lens to an open side and/or displaying a portion of an image in an enlarged manner while the focus position is being adjusted by the user. According to Japanese Patent Laid-Open No. 2006-54536, by confirming the enlarged screen when adjusting the focus position, it is possible to precisely adjust the focus position.

In the technology disclosed in Japanese Patent Laid-Open No. 2006-54536, however, in the case where no focus region is included in the enlarged screen, the user cannot easily determine whether the subject is front-blurred or back-blurred, and as such the focus position is not easy to adjust.

SUMMARY OF THE INVENTION

The present disclosure has been made in consideration of the aforementioned issues, and realizes a technique capable of easing the determination of the focus state even when the user scales the image in focus adjustment.

In order to solve the aforementioned problems, one aspect of the present disclosure provides an image processing apparatus comprising a memory and at least one processor which function as: an obtaining unit configured to obtain an image; a scaling unit configured to generate a scaled image obtained by scaling at least a portion of the obtained image; and a display control unit configured to display the obtained image or the scaled image and defocus information including a shift amount and a shift direction of a focal point in the image in a superimposed manner on a display, wherein in a case where displaying the obtained image on the display, the display control unit superimposes, on the obtained image, defocus information of a first defocus range that includes a range to be focused, and in a case where displaying the scaled image on the display, the display control unit superimposes, on the scaled image, defocus information of a second defocus range that includes at least a portion of a defocus range of the scaled image.

Another aspect of the present disclosure provides, a control method of an image processing apparatus comprising: obtaining an image; generating a scaled image obtained by scaling at least a portion of the obtained image; and displaying the obtained image or the scaled image and defocus information including a shift amount and a shift direction of a focal point in the image in a superimposed manner on a display, wherein in a case where displaying the obtained image on the display, defocus information of a first defocus range that includes a range to be focused is superimposed on the obtained image, and in a case where displaying the scaled image on the display, defocus information of a second defocus range that includes at least a portion of a defocus range of the scaled image is superimposed on the scaled image.

Still another aspect of the present disclosure provides, a non-transitory computer-readable storage medium storing a program for causing a computer to execute a control method of an image processing apparatus, the method comprising: obtaining an image, generating a scaled image obtained by scaling at least a portion of the obtained image; and displaying the obtained image or the scaled image and defocus information including a shift amount and a shift direction of a focal point in the image in a superimposed manner on a display, wherein in a case where displaying the obtained image on the display, defocus information of a first defocus range that includes a range to be focused is superimposed on the obtained image, and in a case where displaying the scaled image on the display, defocus information of a second defocus range that includes at least a portion of a defocus range of the scaled image is superimposed on the scaled image.

According to the present invention, it is possible to ease the determination of the focus state even when the user scales the image in focus adjustment.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A and 2B are diagrams schematically illustrating an example of a configuration of an imaging unit according to the first embodiment.

FIG. 3 is a block diagram illustrating an example of a functional configuration of an image processing unit according to the first embodiment.

FIG. 7 is a diagram illustrating an example of an image before enlargement and a processed image after enlargement in the first embodiment.

FIG. 12 is a flowchart illustrating a series of operations according to a defocus information superimposing process according to the second embodiment.

DESCRIPTION OF THE EMBODIMENTS

First Embodiment

Embodiments of the present invention are elaborated below with reference to the drawings. Note that the following describes a use-case where a user uses a photographing device such as a digital camera to capture an image of a person by performing focus adjustment while viewing an EVF and displaying the image in a scaled (e.g., enlarged) state. However, the present embodiment is also applicable to an image processing apparatus capable of obtaining and displaying a captured image and displaying information for the user to perform focus adjustment with the image. Further, the image processing apparatus is also applicable to a case where a digital camera can be remotely controlled, an image captured by the digital camera is obtained and displayed on the image processing apparatus, and the user operates the device to perform focus adjustment of the digital camera, for example. The image processing apparatus may include a digital camera, a mobile phone including a smartphone, a gaming device, a tablet terminal, a watch or spectacles information terminal, a medical device, a surveillance system, an in-vehicle system, and the like.

An example case is described below in which image-capturing is performed by manual focus (MF) in which the focus is adjusted by operating an operation member for focus adjustment (e.g., by moving a lens focus adjustment ring). Alternatively, the present embodiment is also applicable to other use cases such as a case where the focus is confirmed by partially enlarging the display screen in autofocus (AF) capturing.

Configuration of Digital Camera

Figure 1:
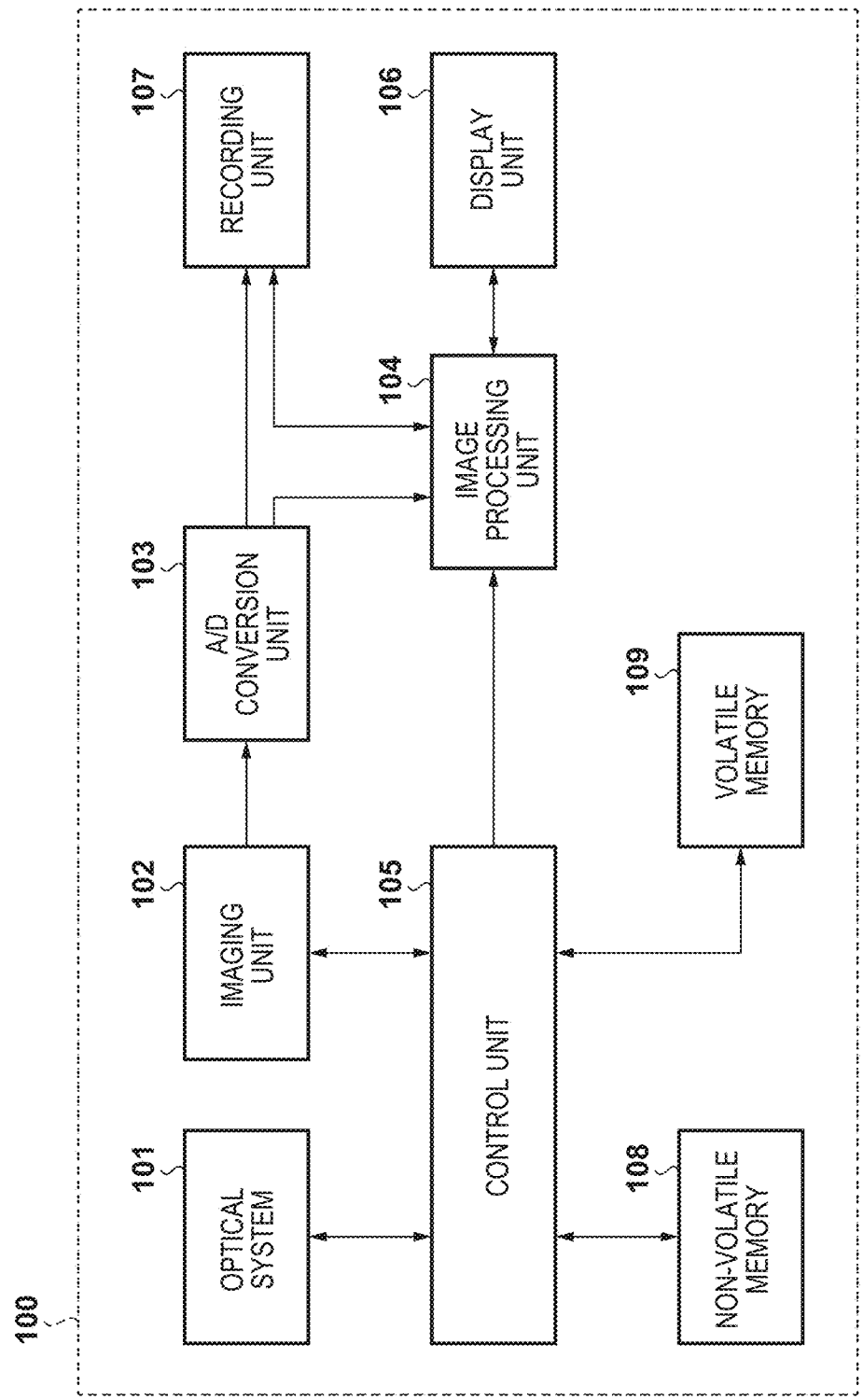
FIG. 1 is a block diagram illustrating an example of a functional configuration of a digital camera as an example of an image processing apparatus according to a first embodiment.

FIG. 1 is a block diagram illustrating an exemplary functional configuration of a digital camera 100 as an example of the image processing apparatus of the present embodiment. Note that one or more of the functional blocks illustrated in FIG. 1 may be implemented by hardware such as an ASIC and a programmable logic array (PLA): or by software executed by a programmable processor such as a CPU or an MPU. A combination of software and hardware may be used for the implementation. Accordingly, in the following description, even when different functional blocks are described as operating subjects, the same hardware may be implemented as a subject.

An optical system 101 includes a lens group including a zoom lens and/or a focusing lens, an aperture adjusting device for adjusting the light amount, and a shutter device. The optical system 101 adjusts the focus position and the magnification of a subject image reaching an imaging unit 102 by advancing and retracting the lens group in the optical axis direction.

The imaging unit 102 includes a photoelectric conversion element such as a CCD sensor and a CMOS sensor for converting a luminous flux of a subject having passed through the optical system 101 into an electrical signal through photoelectric conversion and outputs an analog image signal converted to the electrical signal at a predetermined time interval. The imaging unit 102 according to the present embodiment includes a pixel array as illustrated in FIG. 2A, and in this pixel array, individual pixels 202 are regularly two-dimensionally arranged. As illustrated in FIG. 2B, the pixel 202 in the pixel array includes a microlens 201 and a pair of photoelectric conversion units 203 and 204. The pair of photoelectric conversion units 203 and 204 receive respective luminous fluxes having passed through different regions of an exit pupil of the optical system 101 and perform photoelectric conversion. Thus, an image signal (e.g., referred to as image A) based on the photoelectric conversion unit 203 side and an image signal (e.g., referred to as image B) based on the photoelectric conversion unit 204 side have a phase difference in the subject image. The imaging unit 102 outputs analog image signals of the image A and the image B, for example.

An A/D conversion unit 103 converts the analog image signal output from the imaging unit 102 into a digital image signal. An image processing unit 104 performs a normal signal process and a defocus information superimposing process described later on the digital image signal from the imaging unit 102. Here, the normal signal processing includes, for example, a noise reduction process, a developing process, and a process of compressing the tonality to a predetermined output range through a tonality compression process using gamma conversion. Note that the control unit 105 may include the image processing unit 104 so as to have the functions of the image processing unit 104.

The control unit 105 includes, for example, a processor such as a CPU and an MPU and controls the operations of the blocks included in the digital camera 100 by deploying the program recorded in a non-volatile memory 108 into a volatile memory 109 and executing the program. For example, the control unit 105 calculates an exposure amount in image-capturing for obtaining an input image with appropriate brightness and controls the aperture, the shutter speed, and the analog gain of the sensor by controlling the optical system 101 and the imaging unit 102 so as to achieve the calculated exposure amount. In addition, the control unit 105 executes a part of the defocus information superimposing process described later (in the case where the control unit 105 serves also as the image processing unit 104, the control unit 105 executes the entire defocus information superimposing process).

A display unit 106 sequentially displays the image signal output from the image processing unit 104 on a display member such as an LCD. The recording unit 107 includes, for example, a storage medium such as a semiconductor memory and records an image taken by the imaging unit 102 and processed by the image processing unit 104 and the like. It is possible to include a removable information storage medium using a memory card in which a semiconductor memory is mounted, a package containing a rotational recording member such as a magneto-optical disk, and the like.

Configuration of Image Processing Unit

Next, a configuration of the image processing unit 104 according to the present embodiment is described with reference to FIG. 3. Each block of the image processing unit 104 may be achieved by a combination of software and hardware. Also, a plurality of functional blocks may be integrated, or one functional block may be separated.

A signal processing unit 301 performs the above-described normal signal processing such as a noise reduction process and a developing process. Note that the signal processing unit 301 may synthesize signals of the image A and the image B so as to handle one image signal. A capturing information obtaining unit 302 obtains various information such as the focal distance, the aperture value, the exposure time, and the capturing mode set by the user during image-capturing from the non-volatile memory 108 or the volatile memory 109 via the control unit 105, for example, and provides the information to a defocus calculation unit 304.

An edge generating unit 303 generates an edge signal from the image signal output from the signal processing unit 301. The defocus calculation unit 304 obtains the image signal of the image A and the image B. The defocus calculation unit 304 generates a defocus map indicating the distribution (i.e., the shift amount and shift direction of the focal point) of the defocus in the taken image on the basis of the phase difference of the subject image generated by luminous fluxes coming from different regions of the exit pupil of the optical system 101.

A region information obtaining unit 305 obtains information about the position of a region in the enlarged display set by the user. A display control unit 306 uses the output of the signal processing unit 301, the edge generating unit 303, the defocus calculation unit 304, and the region information obtaining unit 305 to generate a processed image, in which defocus information about the image is superimposed on the image, and displays the processed image on the display unit 106.

Series of Operations Relating to Defocus Information Superimposing Process

Figure 4:
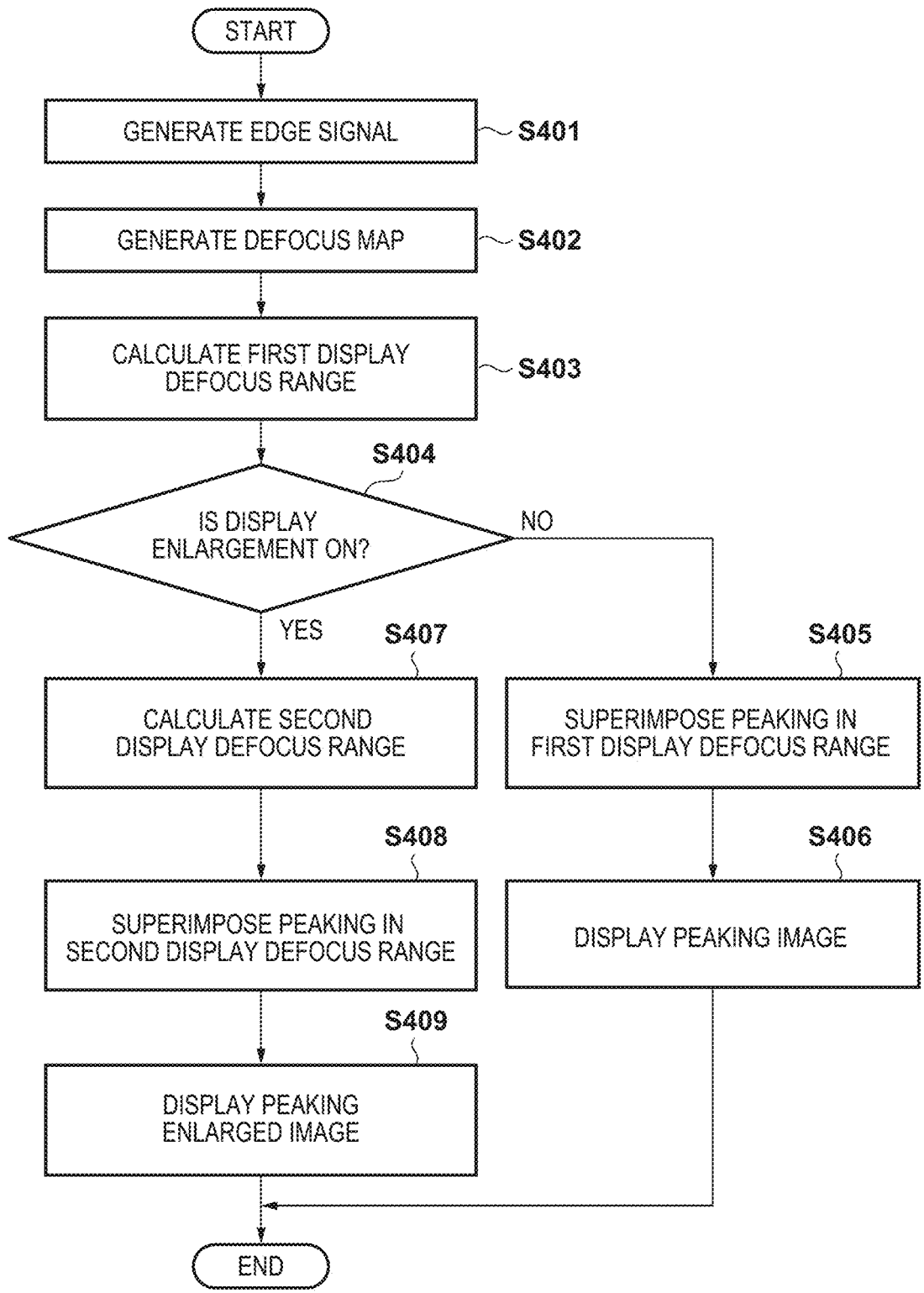
FIG. 4 is a flowchart illustrating a series of operations according to a defocus information superimposing process according to the first embodiment.
Figure 5A:
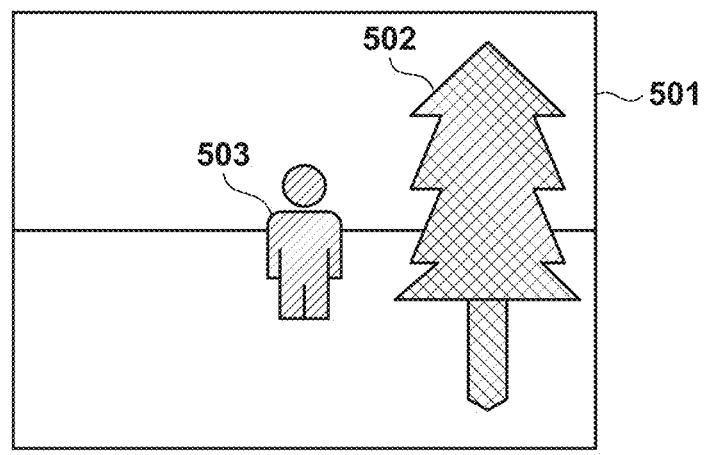
FIGS. 5A to 5C are diagrams illustrating an example of an input image, an edge signal, and a defocus map according to the first embodiment.

Next, a series of operations of the defocus information superimposing process according to the present embodiment is described with reference to FIG. 4. This defocus information superimposing process is executed when the focus state (for focus adjustment) is determined by displaying the image in an enlarged manner on the EVF at the time of still-image capturing, for example. While the following describes an example in which the process illustrated in FIG. 4 is performed by the parts of the image processing unit 104 unless otherwise described, the process may be achieved by deploying the program of the non-volatile memory 108 into the volatile memory 109 and executing the program by the control unit 105 including the image processing unit 104. In addition, in the example described below, the process is a process for one frame of an obtained image, and the obtained image is an input image 501 illustrated in FIG. 5A. The input image 501 is, for example, a captured image of a scene in which a person 503 is standing at the center and a tree 502 is present on the front right side of the person.

Figure 5B:
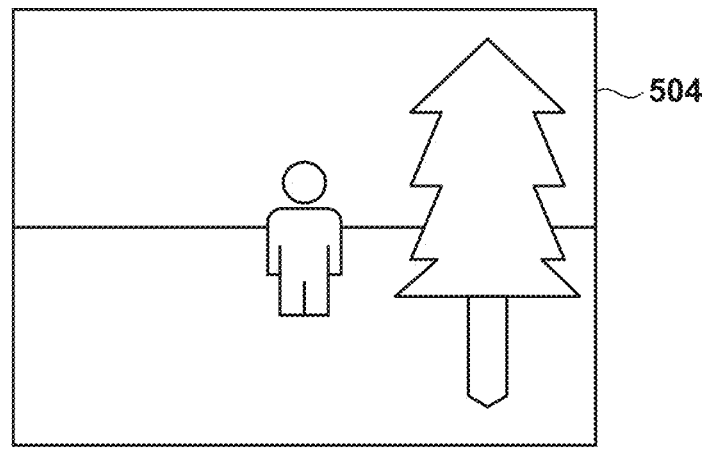

At S401, the edge generating unit 303 generates an edge signal by applying a band-pass filter (Bpf) to the input image 501. Specifically, the edge generating unit 303 adds a signal to which a filter of [−1 0 2 0 −1] is applied in each of the horizontal direction and the vertical direction. Note that the method of generating an edge signal is not limited to this, and it is also possible to adopt other methods such as a method of extracting edge components by calculating the difference between the original image and the image to which a low-pass filter (Lpf) is applied. An image 504 illustrated in FIG. 5B indicates an edge signal obtained by the edge generating unit 303.

Figure 5C:
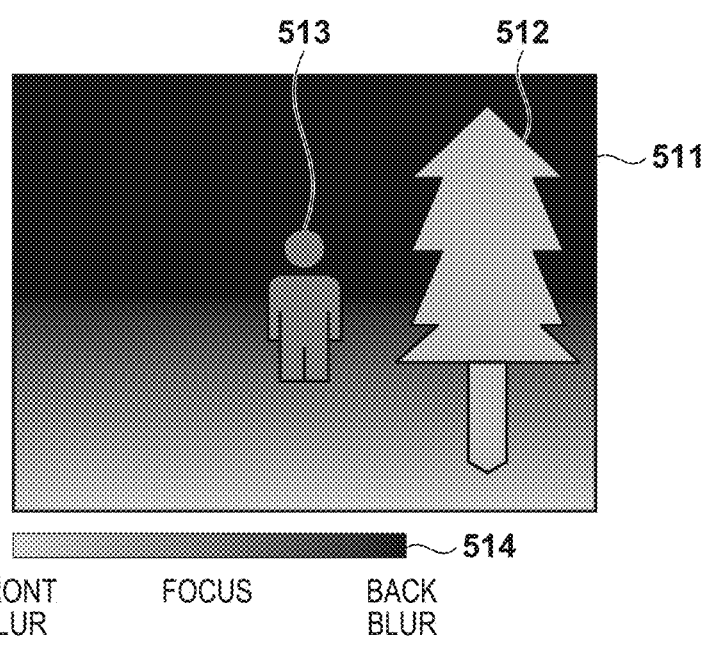

At S402, the defocus calculation unit 304 generates a defocus map for the input image 501. The defocus calculation unit 304 may use a known technique disclosed in Japanese Patent Laid-Open No. 2016-9062, for example, and calculates the defocus amount (i.e., the shift amount and shift direction of the focal point) for each pixel so as to handle it as the defocus map. An image 511 illustrated in FIG. 5C indicates an example of a defocus map generated by the defocus calculation unit 304. In the image 511 of the defocus map, the region of a tree 512 on the front right side has a value of a range indicating focus, and a person 513 at the center has a value of a range indicating non-focus of back blur. Regarding the defocus amount (i.e., the shift amount and shift direction of the focal point), a guide 514 indicates a correspondence between each pixel value of the defocus map and the shift amount and shift direction of the focal point.

Figure 6A:
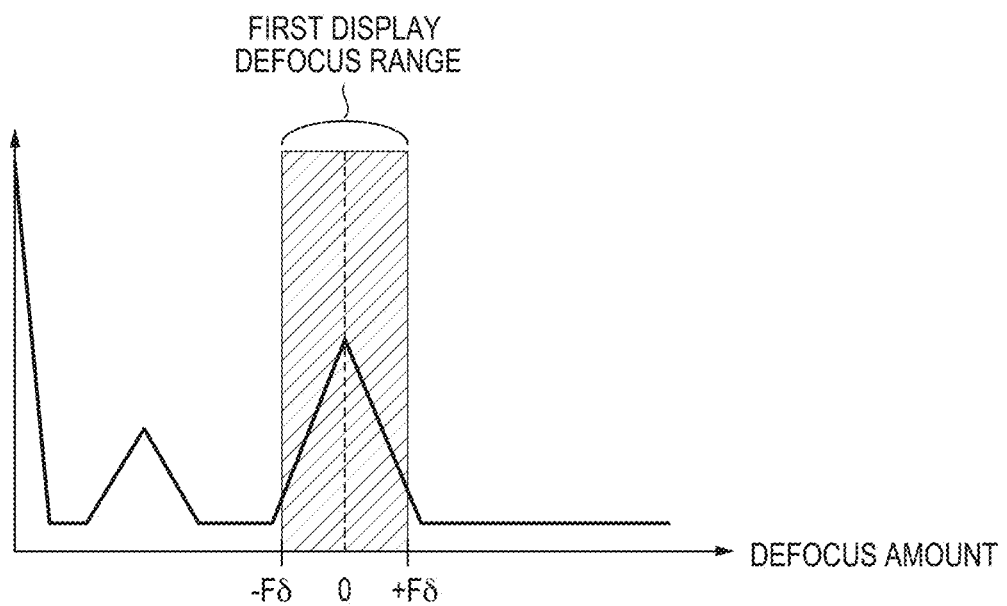
FIGS. 6A and 6B are diagrams illustrating a histogram of a defocus amount of an input image and an enlarged image according to the first embodiment.

At S403, the defocus calculation unit 304 calculates a first display defocus range. Here, the first display defocus range is a value range of defocus that is determined to be included in the depth of field at the time of still-image capturing, for example. FIG. 6A illustrates this range, where the aperture value obtained by the capturing information obtaining unit 302 for the input image 501 is represented by F, the value of the permissible circle of confusion dependent on the number and size of pixels of the imaging unit 102 is represented by δ, and the upper limit value and the lower limit value of the range are represented by +Fδ and −Fδ, respectively. FIG. 6A illustrates a histogram of the defocus indicated in the image 511 of the defocus map. In FIG. 6A, the vertical axis represents the frequency (the number of pixels) and the horizontal axis represents the defocus amount. The defocus amount indicated by the dashed line in the drawing indicates that the value of the defocus is 0. When the defocus amount is 0, the degree of the focus is maximum, the + values indicate changes of the degree of the focus in the direction of the front blur, and non-focus occurs when the value is equal to or greater than a predetermined value. On the other hand, the − values indicate changes of the degree of the focus in the direction of the back blur, and non-focus occurs when the value is equal to or greater than a predetermined value. That is, the region where the value of defocus falls within the range of −Fδ to +Fδ can be determined to be included within the depth of field (i.e., the first display defocus range).

At S404, the control unit 105 determines whether an instruction of scaling the display image (here, an instruction of display enlargement) has been made by the user. When the control unit 105 determines that an instruction of display enlargement has been received, the process proceeds to S407; otherwise the process proceeds to S405.

At S405, the display control unit 306 generates a processed image in which a peaking is superimposed on the input image 501. For example, the display control unit 306 superimposes a peaking (a color indicating the focus range, e.g., a green signal) on the input image 501 in a region where the edge signal generated at S401 is equal to or greater than a predetermined value and the defocus amount generated at S402 is included in the first defocus range. A processed image 701 in FIG. 7 is an example of a processed image obtained by superimposing a peaking, in which a green signal is superimposed only on the edge region of a tree 702 on the front right side such that the region is conspicuous (bold line). Conversely, the green color is not superimposed on a person 703 at the center (thin lines), thus indicating that this region is outside of the depth of field.

At S406, the display control unit 306 performs a control to display the generated processed image 701 on the display unit 106. Thus, by confirming the green edge, the user can easily recognize that the tree 702 on the front right side is within the depth (and the person 703 is outside the depth) in the current focus state.

Figure 6B:
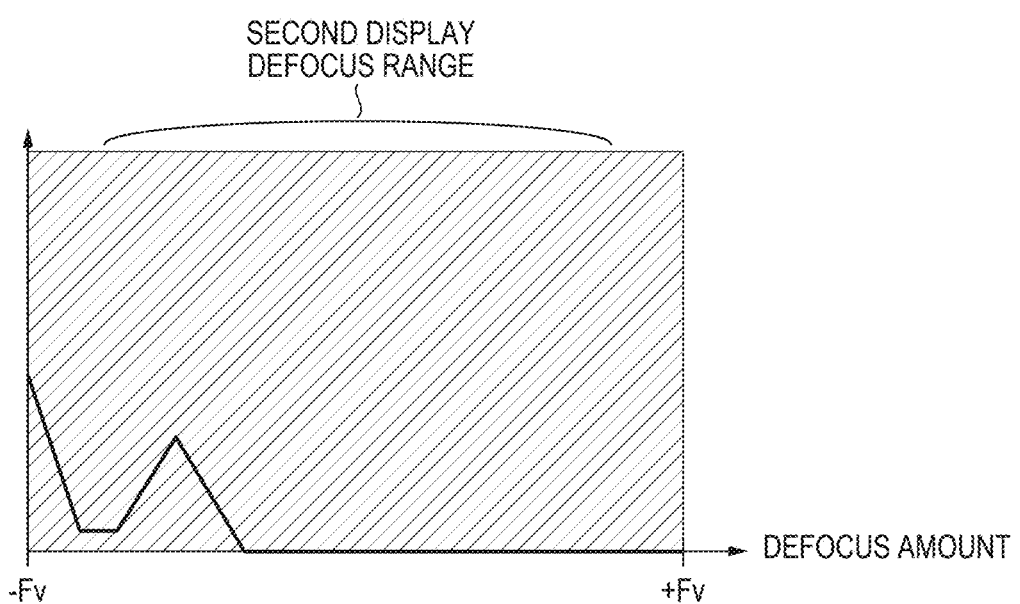

At S407, the defocus calculation unit 304 obtains the information of the enlarged region from the region information obtaining unit 305 and calculates a second display defocus range on the basis of the defocus map in the obtained region. Here, the second display defocus range is, for example, a value range of the defocus that is displayed to the user to partially or wholly focus on a subject of a scaled image (here, an enlarged region). Here, the enlarged region is, for example, the portion inside a frame 704 of the single-dot chain line in FIG. 7, where the person is present. Since the defocus amount in this region is not included in the first display defocus range, the defocus calculation unit 304 widens the second display defocus range. By widening the second defocus range, the subject of the enlarged region can be included in the second display defocus range. This range can be calculated by setting the second display defocus range to −Fv to +Fv, where Fv represents the maximum value of the absolute value of the defocus amount in the enlarged region. In this manner, the subject in the enlarged region can always be included in the second display defocus range. FIG. 6B illustrates the second display defocus range. Note that the method of calculating the second display defocus range is not limited to this, and the Fv may be determined such that half of the enlarged region is set as the second display defocus range, for example.

At S408, the display control unit 306 generates a processed image to be displayed in which a peaking is superimposed on a scaled image (i.e., an enlarged region). Specifically, a peaking (here, a color corresponding to the defocus value, e.g., a multi-color signal) is superimposed on the enlarged region in the portion where the edge signal generated at S401 is equal to or greater than a predetermined value and is in the second defocus range. An image 711 illustrated in FIG. 7 indicates an image resulting from superimposition of a peaking on an enlarged region. That is, a blue peaking (bold line) indicating the back blur is superimposed on a person 712 at the center, who has not been peaked before the enlargement. Thus, the user can determine whether the blur of the enlarged region is front blur or back blur (i.e., the direction of the blur).

At this time, the display control unit 306 superimposes a guide 713 on the enlarged region such that the correspondence between the displayed color and the defocus amount (the shift amount and shift direction of the focal point) can be easily determined. The shape of the guide 713 is not limited to the vertically long rectangular shape indicated in the image 711 of FIG. 7 and may be a rectangular shape, a circular shape, or a sector shape as long as the correspondence between the color and the defocus amount is indicated. In addition, the position of the guide 713 may be located at a portion where the subject is not displayed so that the guide does not overlap the subject.

At S409, a control is performed such that the processed image (the processed enlarged region 711) generated by the display control unit 306 is displayed on the display unit 106. In the processed enlarged region 711, a blue peaking indicating the back blur is superimposed on the person 712, and thus the focus information of the subject in the enlarged image can be displayed to the user. Here, the focus information is information that allows the user to easily determine the current focus state and assists in partially or entirely focusing on the enlarged images.

Note that in the present embodiment, an exemplary edge processing method is described in which the display control unit 306 superimposes a color signal on the image. Alternatively, other processing methods may be used, such as a method of changing the saturation and/or the brightness of the edge in accordance with the defocus amount. Here, the same edge processing method may be used before and after enlargement. In this manner, it is possible to display focus information that is easy to understand for the user.

In addition, while the edge is processed to superimpose the focus information in the present embodiment, the display control unit 306 may superimpose the focus information in other display modes. For example, when the majority of the enlarged region is front-blurred, a red color corresponding to the average defocus amount of the front-blurred region may be superimposed on the outer frame of the enlarged region. In this manner, the focus information can be superimposed without reducing the visibility of the subject.

Figure 11:
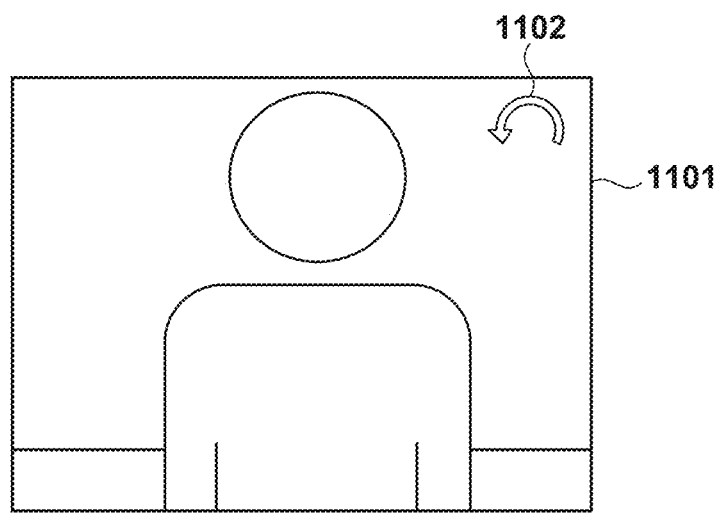
FIG. 11 is a diagram illustrating an example of a case where an icon is displayed as an example of defocus information.

Further, the display control unit 306 may superimpose an icon indicating the front blur on the screen. Examples of the shape of the icon may include a round arrow 1102 that indicates the moving direction of the focus adjustment ring for focus adjustment to a more focused image as in an enlarged region 1101 of FIG. 11. Superimposing the round arrow 1102 allows the user to intuitively operate the defocus adjustment ring. In other words, such an icon is a display that represents a suggestion for a focus adjustment operation to be performed by the user and can also guide the user to make a more appropriate focus adjustment.

The display control unit 306 may superimpose the focus information as a waveform representing the relationship between the defocus amount and the position in a predetermined direction of the image.

Further, the display control unit 306 may not superimpose the focus information for the enlarged region when a predetermined time period has elapsed after the enlarged displaying. In addition, in the case where the multi-color peaking display in which the focus information is distinguishably displayed with a plurality of colors is performed in the enlarged display, rather than being multi-color, the number of colors may be reduced (e.g., to only one color) and superimposed, where a predetermined time period has elapsed after the enlarged displaying. In addition, the amount of the superimposed information may be reduced, and, for example, the superimposing region may be reduced by narrowing the second display defocus range. In this manner, it is possible to reduce the poor visibility of the subject and the cognitive load of the user due to the superimposition of the focus information.

The display control unit 306 may superimpose the focus information of the subject when the instruction to the operation member for focus adjustment is stopped (e.g., when the operation of the focus adjustment ring and/or the focus adjustment UI is stopped). It is presumed that the instruction of the focus adjustment (e.g., the focus adjustment ring) stops when the user cannot determine whether the subject is front-blurred or back-blurred. The display control unit 306 can display required information at a required timing for the user by superimposing the focus information when instruction of the focus adjustment (e.g., the focus adjustment ring) is stopped. In this manner, it is also possible to achieve an effect of preventing a situation where the visibility of the subject is reduced during the focus adjustment.

Further, in this embodiment, a process for a still-image capturing scene at a moment is described as an example. However, in practice, the defocus amount of the subject varies during image-capturing due to a movement of the subject and a focus adjustment by the user. Accordingly, in the case where the display control unit 306 determines that the defocus amount of the subject has changed during display of the focus information, the display control unit 306 may change the second display defocus range on the basis of the defocus amount of the enlarged region. In this manner, the focus information of the enlarged region can be continuously displayed.

In addition, in the present embodiment, the second display defocus range is determined on the basis of the defocus range of the enlarged region. Alternatively, the user may perform the adjustment with an operating member, such as a dial and a switch, for adjusting the second display defocus range.

Further, a configuration of generation based on the phase difference of the subject image generated by the luminous fluxes coming from different regions of the exit pupil of the image-capturing optical system is described in the present embodiment as a configuration for obtaining distance information as illustrated in FIG. 2A. However, other configurations and units may be used alone or in combination. For example, it is also possible to adopt a configuration in which, with a compound camera including a plurality of lenses and imaging elements, a more accurate image shift amount can be detected on the basis of a plurality of images having a plurality of different viewpoints or a plurality of different focus positions. In addition, with a configuration in which the distance can be measured with a time of flight (TOF) camera and ultrasonic waves, defocus information can be obtained, and the distance measurement performance for a subject with poor pattern change can be improved.

As described above, according to the present embodiment, the focus information corresponding to the defocus amount of the subject is displayed in a superimposed manner on the scaled image when the display is enlarged. This allows the user to easily determine the focus state even in the case where the user scales the image when performing focus adjustment. In addition, the user can easily determine the state of focus, and thus the focus adjustment during image-capturing can be eased for the user.

Second Embodiment

A second embodiment is described below. In the second embodiment, an example is illustrated in which the second display defocus range is made narrower than the first display defocus range to increase the ease of the confirmation of the enlarged screen, particularly the focused subject. In the present embodiment, the defocus information superimposing process partially differs from the first embodiment, but the configuration of the digital camera 100 of the present embodiment is substantially the same as that of the first embodiment. For this reason, identical configurations are denoted with the same reference signs and redundant descriptions thereof are omitted, and the differences will be mainly described. A defocus information superimposing process according to the present embodiment is described below.

Series of Operations Relating to Defocus Information Superimposing Process

As in the first embodiment, the defocus information superimposing process is performed when determining the focus state (for focus adjustment) by displaying the image on the EVF in an enlarged manner at the time of still-image capturing. While the following describes an example in which the process is performed by the components of the image processing unit 104 unless otherwise described, the process may be achieved by deploying the program of the non-volatile memory 108 into the volatile memory 109 and executing the program by the control unit 105 including the image processing unit 104. However, unlike the example described in the first embodiment, the person at the center is in focus. In addition, in the example described below, the process is a process for one frame of an obtained image, and the obtained image is the input image 501 illustrated in FIG. 5A. However, unlike the example described in the first embodiment, the person at the center is in focus.

As in the first embodiment, the components of the image processing unit 104 and the control unit 105 perform the processes of S401 to S406. Note that since the center person is in focus in the input image of the present embodiment, the defocus map generated in the S402 differs from that described in the first embodiment. An image 801 illustrated in FIG. 8 indicates a defocus map obtained in the present embodiment. A person 803 at the center has a value indicating focus and a tree 802 on the front right side indicates non-focus of the front blur. A guide 804 indicates a correspondence between the displayed color and the defocus amount.

Figure 8:
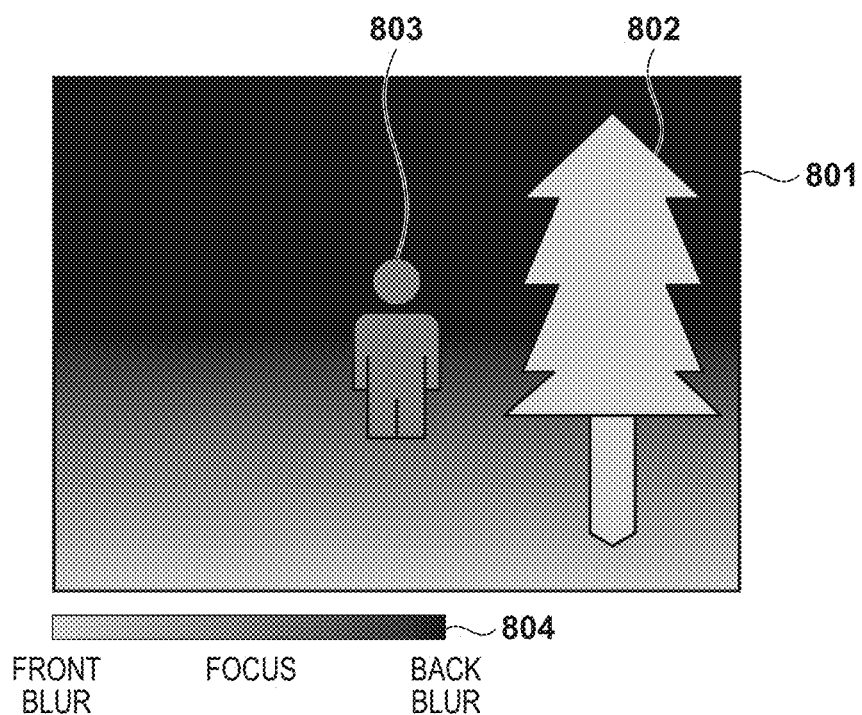
FIG. 8 is a diagram illustrating an example of a defocus map according to a second embodiment.
Figure 9A:
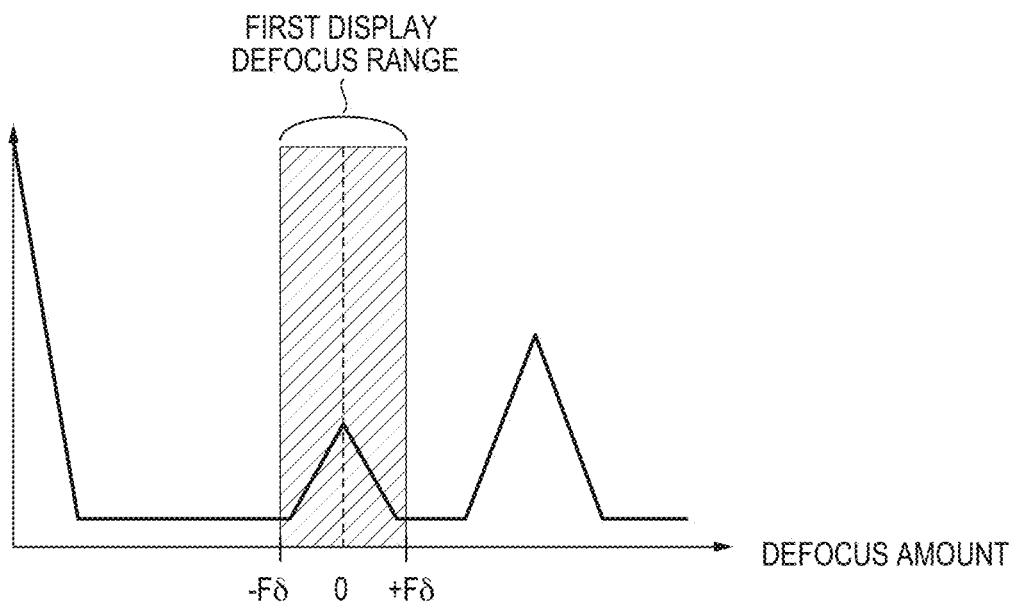
FIGS. 9A and 9B are diagrams illustrating a histogram of a defocus amount of an input image and an enlarged image according to the second embodiment.
Figure 10:
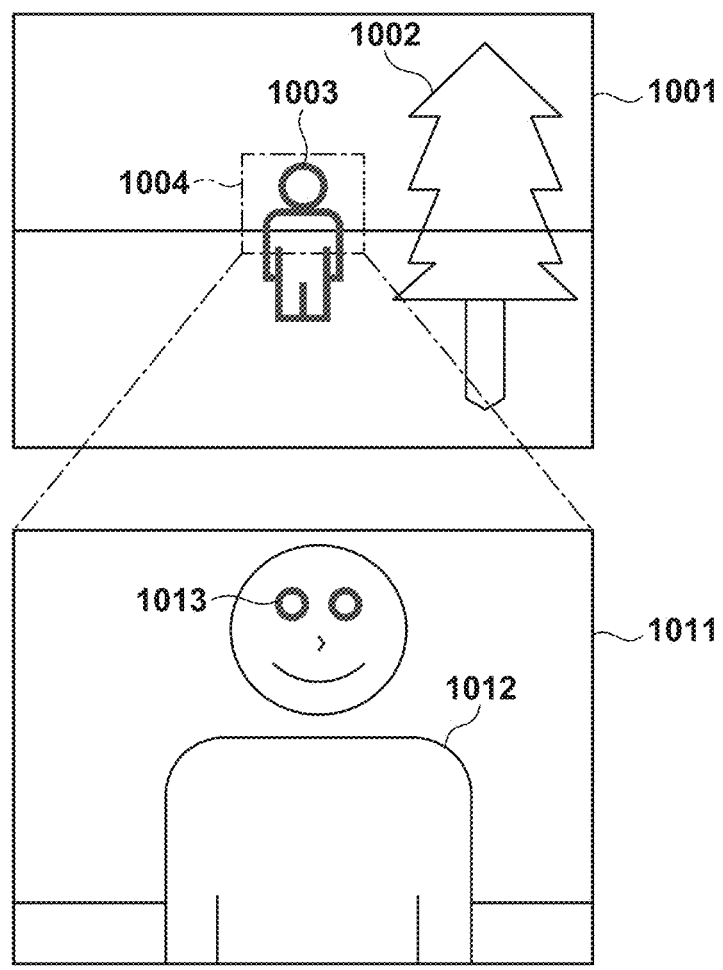
FIG. 10 is a diagram illustrating an example of an image before enlargement and a processed image after enlargement according to the second embodiment.

FIG. 9A illustrates a histogram for the defocus map illustrated in FIG. 8 for use in the process of S403, for example. Further, an image 1001 illustrated in FIG. 10 is obtained as a result of the process of S405. In the process of S405, the display control unit 306 emphasizes the edge region (bold line) of a person 1003 at the center, and thus the user can confirm that the center person is within the depth of field. In the process of S404, in the case where the control unit 105 determines that the enlarged display is ON, the process proceeds to S1201.

In the succeeding processes of S1201 to S1204, the second display defocus range is calculated so as to correspond to S407 of the first embodiment. Note that the second display defocus range calculated in the present embodiment is different from that of the first embodiment as described above. Whether the calculation method of the first embodiment or the calculation method of the present embodiment is used is determined on the basis of the values of the defocus maps of the enlarged region and the first display defocus range.

Specifically, in S1201, the defocus calculation unit 304 calculates the number of pixels in the enlarged region in the first display defocus range. At S1202, the defocus calculation unit 304 determines whether the calculated number of pixels is greater than a predetermined number, and the process proceeds to S1203 in the case where it is determined that the number of pixels is large and to S1204 in the case where it is determined small. In other words, through the processes of S1201 to 1202, whether the enlarged region includes a focused region of a predetermined size is determined, and when the focused region is included in the enlarged region, the particularly focused region is indicated (in more detail) to the user through the process of S1203. On the other hand, when the enlarged region does not include the focused region, the defocus range is changed to include a subject displayed in the enlarged region by setting a (wider) defocus range through the process of S1204.

At S1203, the defocus calculation unit 304 performs the calculation such that the second defocus range is narrower than the first defocus range. At S1204, the defocus calculation unit 304 performs the calculation such that the second defocus range is wider than the first defocus range. By dynamically determining the calculation method in this manner, the second display defocus range can be appropriately determined in accordance with the defocus amount of the enlarged region.

Figure 9B:
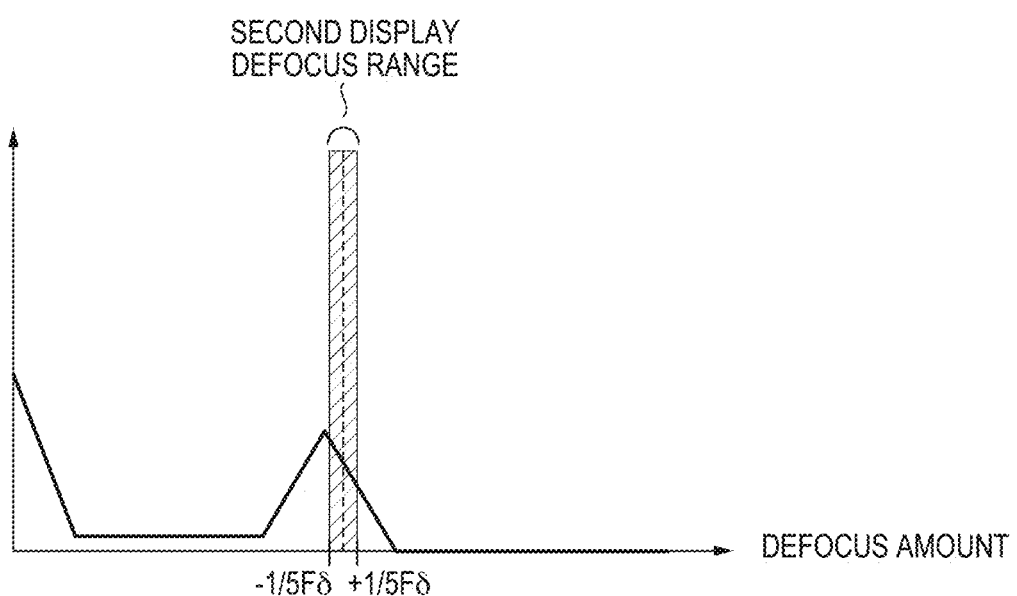

For example, the enlarged region that is processed at S1203 is within a frame 1004 of the single-dot chain line of FIG. 10, and the defocus map of the enlarged region is as illustrated in FIG. 9B. Since the number of pixels in the enlarged region within the first display defocus range is greater than zero, the second display defocus range is calculated such that it is narrower than the first display defocus range. As a specific calculation method, the defocus calculation unit 304 sets a range of −⅕Fδ to +⅕Fδ as the second display defocus range with respect to Fδ as a reference, for example.

At S408, the display control unit 306 superimposes the peaking to the enlarged region. Specifically, a green signal is superimposed on the enlarged region in a region where the edge signal generated at S401 is equal to or greater than a predetermined value and the defocus value generated at S402 is included in the second defocus range. An enlarged region 1011 of FIG. 10 indicates an image obtained through the process of the display control unit 306. It can be seen that since the peaking region is smaller than before the enlargement, the green color is not superimposed on the entirety of a person 1012 (thin line), and the green color is conspicuously superimposed on the vicinity of a pupil 1013 (bold line). Thereafter, the display control unit 306 performs the process of S409 as in the first embodiment, and then the series of operations are terminated.

Note that, in the process described above, the range of the second display defocus is narrowed or widened relative to the first display defocus range in accordance with whether the enlarged region includes the first display defocus range in the enlargement of the displayed image. Further, the display defocus range may be changed when the enlargement ratio is reduced (to a value closer to the angle of view of the input image) from the enlarged region that has been enlarged. That is, in response to the reduction of the enlargement ratio in the direction of resetting to the processed image 701 from the enlarged region 711 illustrated in FIG. 7 so as to include the first display defocus range in the image, the second display defocus range that has been enlarged may be changed to the first display defocus range having a smaller size.

As described above, according to the present embodiment, in the case where the enlarged region is included in the defocus range of the focus state, a narrower range of the subject is peaked, and a particularly focused portion in the subject in enlargement can be displayed to the user. That is, even in the case where the user scales the image when performing focus adjustment, the determination of the focus state can be eased. In addition, the user can easily determine the state of focus, and thus the focus adjustment during image-capturing can be eased for the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-214137, filed on Nov. 14, 2018, which is hereby incorporated by reference herein in its entirety.

What is claimed is:

1. An image processing apparatus comprising
a memory and at least one processor which function as:
an obtaining unit configured to obtain an image;
a scaling unit configured to generate a scaled image obtained by scaling at least a portion of the obtained image; and
a display control unit configured to display the obtained image or the scaled image and defocus information including a shift amount and a shift direction of a focal point in the image in a superimposed manner on a display,
wherein
in a case where displaying the obtained image on the display, the display control unit superimposes, on the obtained image, defocus information of a first defocus range that includes a range to be focused, and
in a case where displaying the scaled image on the display, the display control unit superimposes, on the scaled image, defocus information of a second defocus range that includes at least a portion of a defocus range of the scaled image.

2. The image processing apparatus according to claim 1, wherein in a case where displaying the scaled image on the display, the display control unit superimposes defocus information in which the second defocus range is wider than the first defocus range on the scaled image.

3. The image processing apparatus according to claim 1, wherein in a case where displaying the scaled image on the display, the display control unit superimposes defocus information in which the second defocus range is narrower than the first defocus range on the scaled image.

4. The image processing apparatus according to claim 1, wherein the display control unit changes the second defocus range in response to a change in a defocus range of a region of the scaled image, while the scaled image is being displayed on the display.

5. The image processing apparatus according to claim 1, wherein the display control unit superimposes the defocus information by using an edge signal in the obtained image or the scaled image.

6. The image processing apparatus according to claim 1, wherein the display control unit reduces an amount of the defocus information in response to a predetermined amount of time having elapsed after the defocus information of the first defocus range or the defocus information of the second defocus range is displayed on the display in the superimposed manner.

7. The image processing apparatus according to claim 1, wherein the display control unit does not superimpose the defocus information in response to a predetermined amount of time having elapsed after the defocus information of the first defocus range or the defocus information of the second defocus range is displayed on the display in the superimposed manner.

8. The image processing apparatus according to claim 1, wherein in a case where a multi-color peaking display that distinguishably displays the defocus information of the first defocus range or the defocus information of the second defocus range with a plurality of colors is performed, the display control unit reduces a number of the plurality of colors of the defocus information in response to a predetermined amount of time having elapsed after displaying the defocus information on the scaled image in the superimposed manner on the display.

9. The image processing apparatus according to claim 1, wherein in a case where a multi-color peaking display that distinguishably displays the defocus information of the first defocus range or the defocus information of the second defocus range with a plurality of colors is performed, the display control unit displays defocus information having a narrowed defocus range in response to a predetermined amount of time having elapsed after displaying the defocus information on the scaled image in the superimposed manner on the display.

10. The image processing apparatus according to claim 1, wherein the display control unit superimposes, on the scaled image, a guide indicating a correspondence between a color and a defocus amount of the defocus information that is displayed.

11. The image processing apparatus according to claim 1, wherein
in a case where an instruction to an operation member for focus adjustment is stopped, the display control unit displays the defocus information of the second defocus range on the scaled image in the superimposed manner, and
in a case where an instruction is being provided to the operation member for focus adjustment, the display control unit does not display the defocus information on the scaled image in the superimposed manner.

12. The image processing apparatus according to claim 1, wherein the display control unit superimposes, on the scaled image, an icon representing a suggestion for a focus adjustment operation performed by a user.

13. The image processing apparatus according to claim 12, wherein the icon representing the suggestion represents a moving direction of a focus adjustment ring.

14. The image processing apparatus according to claim 1, wherein the display control unit displays the defocus information at a frame of the scaled image in the superimposed manner.

15. The image processing apparatus according to claim 1, wherein the defocus information of the first defocus range or the defocus information of the second defocus range is obtained based on a phase difference of a subject image generated by luminous fluxes coming from different regions of an exit pupil of an imaging optical system.

16. The image processing apparatus according to claim 1, wherein the defocus information of the first defocus range or the defocus information of the second defocus range is obtained based on a plurality of images having a plurality of different viewpoints or a plurality of different focus positions.

17. The image processing apparatus according to claim 1, wherein the defocus information of the first defocus range or the defocus information of the second defocus range is obtained based on a signal of sound waves or light.

18. A control method of an image processing apparatus comprising:
obtaining an image;
generating a scaled image obtained by scaling at least a portion of the obtained image; and
displaying the obtained image or the scaled image and defocus information including a shift amount and a shift direction of a focal point in the image in a superimposed manner on a display,
wherein
in a case where displaying the obtained image on the display, defocus information of a first defocus range that includes a range to be focused is superimposed on the obtained image, and
in a case where displaying the scaled image on the display, defocus information of a second defocus range that includes at least a portion of a defocus range of the scaled image is superimposed on the scaled image.

19. A non-transitory computer-readable storage medium storing a program for causing a computer to execute a control method of an image processing apparatus, the method comprising:
obtaining an image;
generating a scaled image obtained by scaling at least a portion of the obtained image; and
displaying the obtained image or the scaled image and defocus information including a shift amount and a shift direction of a focal point in the image in a superimposed manner on a display, wherein
in a case where displaying the obtained image on the display, defocus information of a first defocus range that includes a range to be focused is superimposed on the obtained image, and
in a case where displaying the scaled image on the display, defocus information of a second defocus range that includes at least a portion of a defocus range of the scaled image is superimposed on the scaled image.

* * * * *